United States Patent [19]

Wolf et al.

[11] 4,358,762
[45] Nov. 9, 1982

[54] INDUCTIVE TRANSDUCER RESPONSIVE TO DISPLACEMENT ALONG A PATH

[75] Inventors: Konrad Wolf, Walzbachtal; Erich Zabler, Karlsruhe, both of Fed. Rep. of Germany

[73] Assignee: Robert Bosch GmbH, Stuttgart, Fed. Rep. of Germany

[21] Appl. No.: 190,491

[22] Filed: Sep. 25, 1980

[30] Foreign Application Priority Data

Oct. 3, 1979 [DE] Fed. Rep. of Germany ....... 2940018

[51] Int. Cl.³ .............................................. G08C 19/08
[52] U.S. Cl. ............................... 340/870.35; 324/208; 336/75; 336/79; 340/870.32
[58] Field of Search ........................ 340/870.35, 870.36, 340/870.31, 870.32; 324/207, 208; 73/119 A, 141 R, 862.67, 862.69, 862; 336/75, 79

[56] References Cited

U.S. PATENT DOCUMENTS

| | | | |
|---|---|---|---|
| 3,046,535 | 7/1962 | Philbin et al. ................... | 340/870.35 |
| 3,384,884 | 5/1968 | Var ................................. | 340/870.35 |
| 3,555,405 | 1/1971 | Martin ............................ | 340/870.35 |
| 4,080,592 | 3/1978 | Zabler ............................. | 340/870.35 |
| 4,083,237 | 4/1978 | Levesque ........................ | 340/870.35 |
| 4,132,980 | 1/1979 | Zabler ............................. | 324/208 |

*Primary Examiner*—James J. Groody
*Attorney, Agent, or Firm*—Frishauf, Holtz, Goodman & Woodward

[57] ABSTRACT

The variable inductor and the comparison inductor of a semi-differential variable inductance both have a pair of coils magnetically coupled together. The output current of an amplitude-controlled oscillator flows through the series combination of one coil of each pair and the other coil of the comparison inductor is used to supply a signal which is rectified in order to regulate the amplitude of the oscillator. The remaining coil, the other coil of the variable inductor, is rectified to provide an output signal representative of the ratio of the variable inductance to the comparison inductance and also representative of the displacement of the short-circuiting ring of the variable inductance, which is mechanically linked to the control rod of a fuel injector of a diesel engine as required for a system controlling the fuel injector. The oscillator and the rectifiers can conveniently use operational amplifiers of the same type designation.

5 Claims, 3 Drawing Figures

INDUCTIVE TRANSDUCER RESPONSIVE TO DISPLACEMENT ALONG A PATH

This invention concerns an inductive displacement transducer suitable for indicating the displacement of a control rod in an internal combustion engine, for example the control rod of a fuel injection mechanism determining the amount of fuel injected per cycle in an engine cylinder. In particular the invention concerns the kind of transducer that utilizes a semi-differential variable inductance unit in which inductance variation is produced by mechanical motion of a short-circuiting ring along a magnetic core providing a magnetic path for the inductor. By a semi-differential variable inductance unit is meant a variable inductance unit which includes also a comparison inductance independently adjustable but kept at a fixed setting in the use of the unit. Semi-differential circuits do not have the degree of balance that full differential circuits have, for example FIGS. 8 and 9 of U.S. Pat. No. 4,132,980 where the inductance of one winding is reduced as that of another winding is increased.

It is known to use a semi-differential inductance unit combining a variable inductor responsive to mechanical displacement and an independent comparison inductor, together with an evaluation circuit by which a signal representative of the displacement is obtained. Apparatus of this type is useful, in the electronic control of a diesel engine, for determining distances of travel and angles, particularly with respect to the control rod of a fuel injection pump. In such an arrangement the short-circuiting ring of the variable inductor is coupled to the control or regulation member the pump so as to move with it. The evaluation circuit needed by apparatus of this type heretofore known is quite complicated on account of the necessity of taking into account the comparison inductance as well as the variable inductance in continuous measurement.

SUMMARY OF THE INVENTION

It is an object of this invention to provide a transducer in which a semi-differential variable inductor is utilized in a simple circuit for evaluation of inductance changes, and particularly one which will be able to provide in a simple fashion a signal indicative of the ratio of the variable to the comparison inductance.

Briefly, both the comparison inductor and the variable inductor of the semi-differential inductance unit are constituted of two coils electromagnetically coupled to each other, one of the coils of each of these inductors being connected in series and together interposed between the output terminal of an amplitude-controlled oscillator and a reference potential such as ground potential, while the other coil of the comparison inductor provides the input to a first rectifier of which the output provides the amplitude control for the oscillator. The second coil of the variable inductor then provides a signal which is rectified in a second rectifier that produces the desired output of the apparatus, namely a signal representative of the ratio of the variable to the comparison inductance.

A particularly advantageous form of the apparatus is one in which the two rectifiers and the oscillator are both built around operational amplifiers of the same manufacture type designation, suitably connected, the oscillator being preferably provided with an amplfying stage of the kind using a cascaded pair of complementary transistors.

BRIEF DESCRIPTION OF THE DRAWINGS

The invention is further described by way of illustrative example with reference to the annexed drawing, in which.

DESCRIPTION OF AN ILLUSTRATIVE EMBODIMENT

Figure 1:
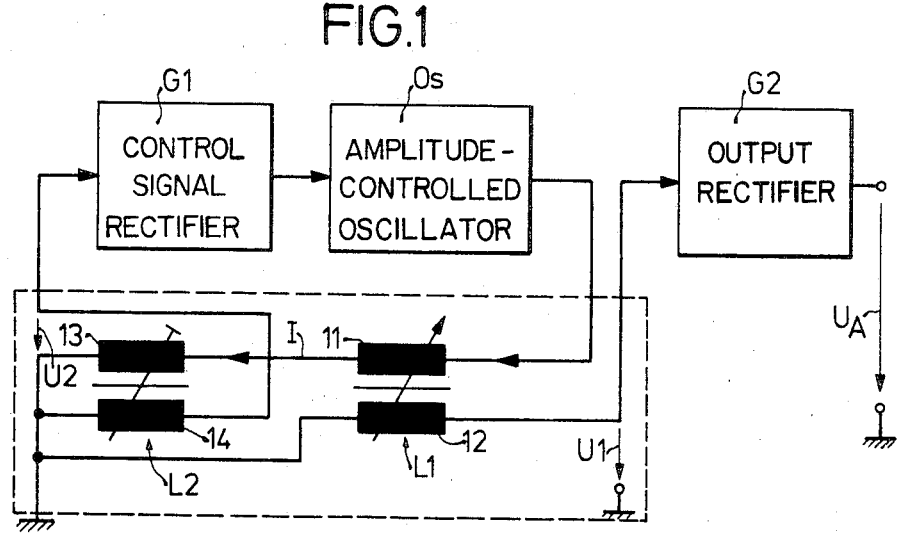
FIG. 1 is a simplified block diagram of a transducer apparatus according to the invention.

FIG. 1 is an overall diagram of apparatus for measuring in terms of an electrical output signal, a mechanical displacement, or length of travel to or from a reference point on a path of travel of the control rod (not shown) of a fuel injection pump of a diesel engine. The transducer apparatus is built around a semi-differential variable inductance unit of the short-circuiting ring type illustrated in FIG. 3 of which the short-circuiting ring 20 is connected by a rod 21 to the fuel injection pump control rod (not shown). This embodiment is usable as a displacement transducer for any of a wide variety of machine-control members, as well as for providing remote indication of the position of various kinds of measuring instruments of which the output is a mechanical displacement.

Figure 3:
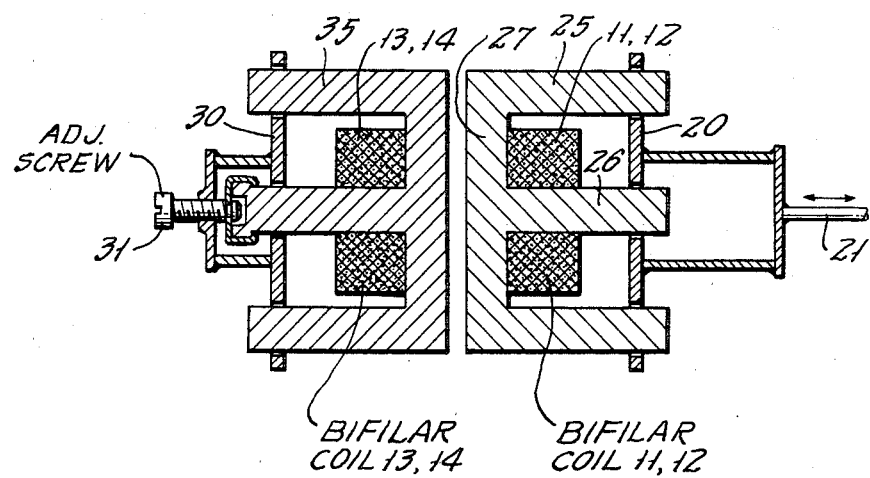
FIG. 3 is a diagramatic view of a semi-differential variable inductance unit of the kind usable in the circuits of FIGS. 1 and 2.

As shown in FIG. 1, the variable inductor portion of the semi-differential unit is provided with two measuring windings 11 and 12 that are magnetically coupled to each other and the comparison inductor portion likewise has two magnetically coupled windings 13 and 14. The inductance adjustment of the latter pair of coupled coils remains fixed during operation of the device. The inductance of the two measuring coils, on the other hand, is variable between a maximum and a minimum value according to the position of the short-circuit ring 20 (FIG. 3).

The evaluation circuit connected to the semi-differential variable inductance unit includes a first rectifying circuit G1, an amplitude-controlled oscillator Os and a second rectifier circuit G2. At the output of the latter is available a voltage $U_4$, which is proportional to the ratio of the variable inductance $L_1$ of the two coils 11 and 12 to the fixed value of inductance $L_2$ of the two comparison coils 13 and 14. The first comparison coil 13 is connected in series with the first measuring coil 11 and the series combination is connected between a reference potential, such as ground, and the output of the oscillator Os. The current I flowing through these two coils generate the (oscillating) voltage U2 in the comparison coil 14 and this voltage is supplied to the rectifier circuit G1 to provide a signal that controls the amplitude of the oscillation produced by the oscillator in such a way that an oscillating voltage U2 of constant amplitude appears at the input of the first rectifier circuit G1. The current I induces a voltage U1 in the second measuring coil 12 which is proportional to the variable inductance L1 and this voltage is rectified by the second rectifying circuit G2 in order to produce the voltage $U_4$. Since in spite of the variations of the position of the short-circuiting ring and hence of the total inductance provided in the oscillator circuit by the series connection of a coil of each inductor, the oscillator is nevertheless controlled so as to operate at a constant amplitude of oscillation, this output may be regarded as continuously calibrated by reference to a constant comparison inductance.

Figure 2:
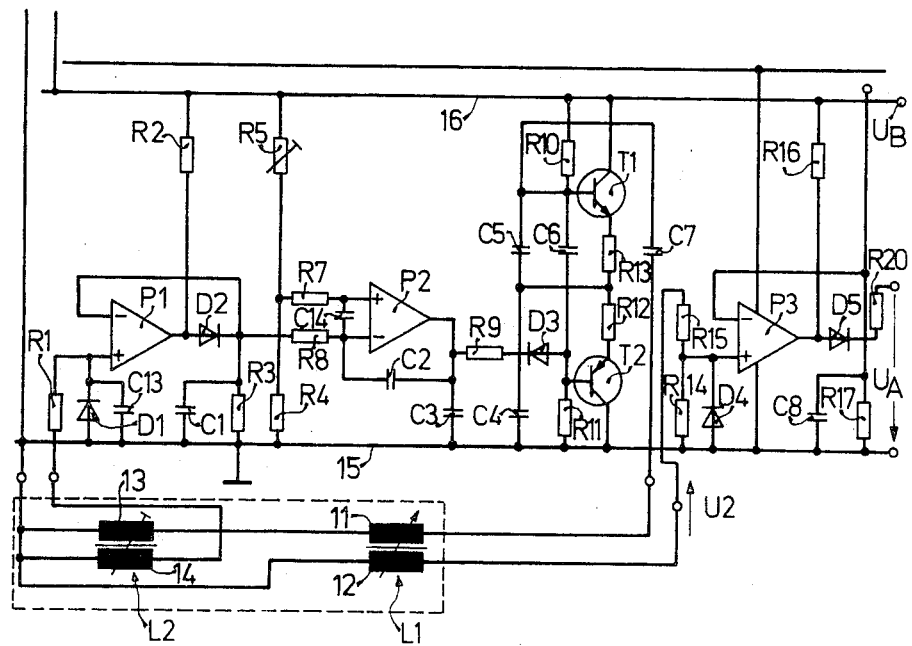
FIG. 2 is a circuit diagram of a preferred embodiment of the apparatus of FIG. 1.

As shown in FIG. 2, the first rectifier circuit G1 is built around an operational amplifier P1, for example, a component available on the market under the type designation B202, of which the non-inverting input is connected through a resistor R1 with the comparison coil 14 and also through a capacitor C13 and a diode D1 in parallel thereto to the common grounded conductor 15 which establishes a reference potential. At the output of the first operational amplifier P1 is connected a resistor R2 through which a connection is made to the common positive potential supply bus 16, and also the anode of a second diode D2, of which the cathode is connected to a feedback connection and also to a network made up of the integrating capacitor C1 and the resistor R3 connected in parallel thereto, which network has its other terminal connected to the ground bus 15. The dc voltage produced at the capacitor C1 is supplied through a resistor R8 to the inverting input of a second operational amplifier P2, of which the non-inverting input is connected through a series input resistor R7 to a voltage divider consisting of the two resistors R4 and R5, to which voltage divider the operating voltage $U_B$ is applied. The non-inverting input of the operational amplifier P2 is also connected through a capacitor C14 to the inverting input of the same operational amplifier. A feedback capacitor C2 connects the output and the inverting input of the second operational amplifier P2, that output also being connected to a capacitor C3 the other terminal of which is grounded to the ground bus 15. The output of the operational amplifier P2 is also connected through a resistor R9 and a diode D3 to the base of a pnp transistor T2 that has its collector electrode connected to the negative or ground bus 15 and its emitter connected through resistors R12 and R3 to the emitter of an npn transistor T1, which on its part has its collector connected to the positive potential bus 16.

The two emitter resistors R12 and R13 are connected to the tap of a capacitive voltage divider formed by the capacitors C5 and C4. The capacitor C5 is connected to the base of the transistor T1 and also through a further capacitor C7 to the first measuring coil 11. A capacitor C6 is connected between the base of transistor T1 and the base of transistor T2. The base of transistor T1 is connected through a resistor R10 with the positive supply bus 16, whereas the base of transistor T2 is connected through a resistor R11 to the negative supply bus 15.

The oscillating voltage U2 induced in the second measuring coil 12, which is coupled magnetically with the first measuring coil 11, are supplied through a resistor R15 to the non-inverting input of a third operational amplifier P3, which like the first operational amplifier P1 operates as a rectifier and delivers, through a diode D5 and a resistor R20, an output voltage $U_A$ that is proportional to the ratio of inductances L1/L2. This output voltage is present at a storage capacitor C8, in parallel with which a discharging resistor R17 is connected.

The non-inverting input of the third operational amplifier P3 is connected, through a resistor R14 and a diode D4 poled in its blocking direction, with the common negative bus 15. The output of this operational amplifier is connected through a resistor R16 to the common positive bus 16.

Inductive transducers of the displacement-indicating short-circuiting ring type are disclosed and explained in U.S. Pat. No. 4,132,980, the disclosure of which is hereby incorporated by reference. FIG. 8 of that patent describes a differential inductance device of that kind. For the present invention, it has been found effective to use a semi-differential variable inductance unit of the same general kind, the structure of which is illustrated in FIG. 3 hereof in the same manner as the structure of other devices is shown in U.S. Pat. No. 4,132,980.

The variable inductor shown in FIG. 3 comprises the core 25 on the central leg 26 of which, near the yoke 27, is mounted a bifilar coil designated 11, 12, because it consists of the pair of coils 11, 12 wound bifilaryl for effective coupling with each other and identical reaction to the displacement with the short-circuit ring 20 in response to the movement of a connecting rod 21. The comparison inductor has a core 35 on which is similarly mounted the bifilar of coil 13, 14, the short-circuiting ring 30 in this case being maintained in a fixed position that is subject to adjustment by the screw 31. The coils are mounted mechanically together as a unit by a means not shown, for example a casing including a mounting plate passing between the cores 25 and 35 made of non-magnetic material, for example of plastic. The windings are connected as shown in FIGS. 1 and 2.

The particular advantage of the invention lies in that the output voltage $U_A$ directly reproduces the ratio of the measuring inductance L1 to the comparison inductance L2. With constant regulated input ac voltage U2 applied to the first rectifier circuit G1 and fixed comparison inductance L2, the same variation ratio results for the output voltage $U_A$ as for the inductance L1.

If the illustrated embodiment of transducer apparatus is exposed to varying ambient temperature, the ohmic resistance of the windings 11, 12, 13 and 14, among other things, varies. The circuit of FIGS. 1 and 2, in contrast to the circuits heretofore known, measures the voltage induced in the comparison inductor winding 14 at high resistance without appreciable superimposed voltage drop from purely ohmic winding resistance and regulates the output voltage of the oscillator Os accordingly, so that only a small effect of temperature on the apparatus results. Although the invention has been described with reference to a particular illustrative embodiment, it will be understood that modifications and variations are possible within the inventive concept. Thus, for example, if is not necessary to wind the coil pairs in bifilar fashion and it is likewise not necessary for the adjustment of the comparison inductor to use an adjustment that operates on a shortcircuiting ring or plate.

We claim:

1. An inductive displacement transducer suitable for indicating the displacement of the fuel injection control rod in an internal combustion engine and utilizing semi-differential variable inductance unit including an adjustable comparison inductor and a variable inductor having a short-circuiting ring movable by a member of which the displacement along a path is to be measured, and further comprising the improvement which consists in that:

both said comparison inductor and said variable inductor of said semi-differential inductance unit are constituted of a first and a second coil magnetically coupled to each other;

one of said coils of said variable inductor of said unit is connected in series with a first coil of said comparison inductor of said unit and the series combination thereof is connected between the output terminal of an amplitude-regulated oscillator and a reference potential such as ground potential;

the second of said coils of said comparison inductor is connected to supply a signal to a first rectifier circuit (G1) that provides an amplitude regulating magnitude to said oscillator (Os) and the second of said coils of said variable unductor of said unit is connected to provide a signal to a second rectifying circuit (G2) having an output for furnishing an electrical signal representative of the ratio of the respective inductances (L1, L2) of said variable and comparison inductors.

2. A transducer as defined in claim 1 in which said first rectifier circuit (G1), said amplitude-controlled oscillator (Os) and said second rectifier circuit (G2) respectively include operational amplifier units producible as identical interchangeable components.

3. A transducer as defined in claim 2 in which said operational amplifier (P2) of said oscillator has its output connected to a power amplifier stage containing a pair of mutually complementary transistors (T1, T2) connected in series.

4. A transducer as defined in claim 1 or claim 2 in which the connection between said series combination of a coil of said variable inductor and a coil of said comparison inductor and said output of said oscillator passes through a coupling capacitor (C7).

5. A transducer as defined in claim 3 in which a coupling capacitor (C7) is interposed between the output of said power amplifier stage of said oscillator (Os) and the said series combination of one coil of said variable inductor and one coil of said comparison inductor of said inductance unit.

* * * * *